June 26, 1934.  H. E. MORTON  1,964,005
CONTROL DEVICE FOR EXHAUST PORT OF PNEUMATIC HAMMER GREASE GUNS
Filed Oct. 26, 1931
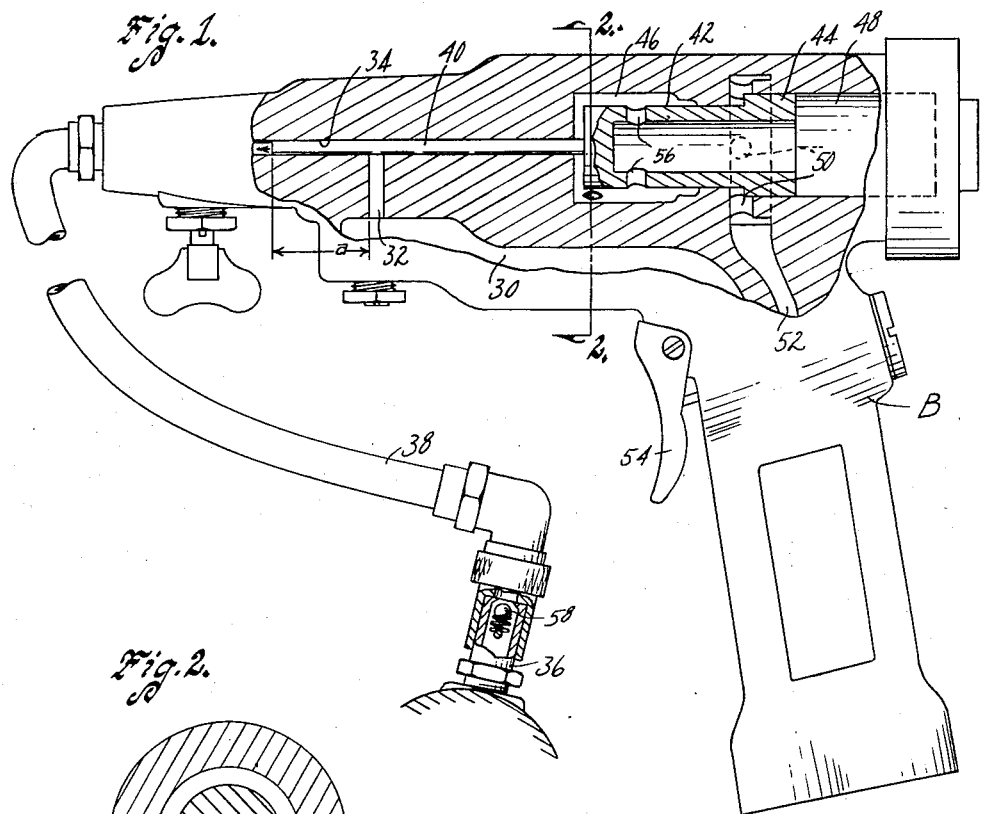
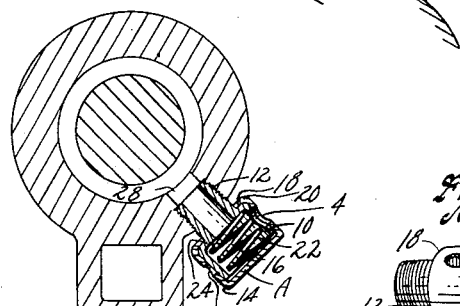
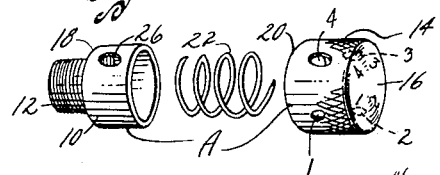
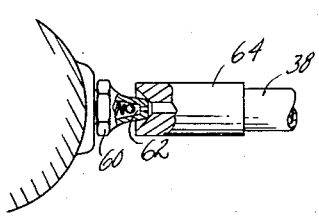
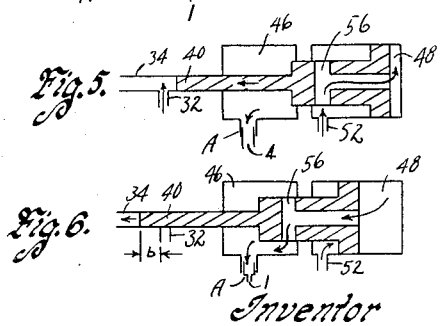
Inventor
Howard E. Morton
By Bair, Freeman & Sinclair
Attorneys
Witness
H. S. Wenzenmaier Patented June 26, 1934

1,964,005

UNITED STATES PATENT OFFICE 1,964,005

CONTROL DEVICE FOR EXHAUST PORT OF PNEUMATIC-HAMMER GREASE GUNS

Howard E. Morton, Bryan, Ohio, assignor to The Aro Equipment Corporation, Bryan, Ohio, a corporation of Ohio Application October 26, 1931, Serial No. 571,116

2 Claims. (Cl. 221—47.3)

An object of my invention is to provide a control device of simple, durable and comparatively inexpensive construction, for varying the size of the exhaust port of a pneumatic-hammer type of grease gun.

A further object is to provide a means for predetermining the quantity of grease expelled from a pneumatic-hammer type of grease gun within a given period.

More particularly, it is my object to provide a control device for such predetermination, which is manually variable, to vary the size of the exhaust port of the pneumatic-hammer grease gun to thereby affect the travel of the grease expeller member by controlling the rate of flow of exhaust air through the exhaust port from the mechanism of the gun.

A further object is to provide a control device especially adapted for a pneumatic grease gun having an exhaust chamber in which exhaust air cushions the expeller member at the end of its expelling stroke, my control device being operable to vary the effective size of the exhaust port and the consequent rate of flow of exhaust air therethrough as well as the volume of the air cushion in the exhaust chamber. By this type of control, the rate of flow of grease from the gun may be effectively controlled.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation partly in section showing the elements of the pneumatic-hammer type of grease gun to which my invention is applied and showing the discharge end of the grease gun applied to an Alemite type of fitting.

Figure 2 is an enlarged sectional view on the line 2—2 of Figure 1 showing my control device inserted in the exhaust port of the grease gun.

Figure 3 is a separated perspective view of the parts of my control device.

Figure 4 is a sectional view showing the discharge end of the grease gun applied to a Zerk type of fitting.

Figure 5 is a diagrammatic view showing the grease gun in initial position with my control device set at maximum adjustment; and Figure 6 is a similar sectional view showing the parts in still another position and my control device set at minimum adjustment.

On the accompanying drawing, I have used the reference character A to indicate generally my control device. It is adapted especially for pneumatic-hammer grease guns, such as indicated generally at B, but can be used on any type of pneumatic-hammer mechanism for controlling the operation thereof.

My control device A comprises a stationary tubular member 10 having a screw-threaded shank 12 and a movable tubular member 14 having a closed end 16. The member 10 has a sealing shoulder 18 and is adapted to snugly fit in the member 14 so that one can rotate relative to the other.

The extreme edge 20 of the member 14 opposite the closed end 16 is turned or "spun" in the form of a flange over the sealing shoulder 18, as best shown in Figure 2, to retain the parts in assembled position. A spring 22 is interposed between a shoulder 24 of the member 10 and the closed end 16, for holding the flange 20 in sealing engagement with the sealing shoulder 18.

The member 10 has an exhaust opening 26 of substantially maximum size, while the member 14 has a plurality of different size exhaust openings, beginning at 4 with maximum and progressing downwardly through 3 and 2 to 1 which is the minimum size opening. These openings may be numbered on the member 14 for convenience of the operator when adjusting the control device.

I have shown my control device A as being pneumatically connected with, or inserted in an exhaust port 28 of the grease gun B. The portion 12 may be screw-threaded for this purpose. The grease gun B includes a grease supply chamber 30 from which a passageway 32 may introduce grease into a cylinder 34. The grease is expelled from the cylinder 34 to a grease fitting 36, through a hose 37 and suitable connections 38 by a plunger 40.

The plunger 40 is part of an expeller member which has an enlarged plunger 42 and an enlarged piston 44. The plunger 42 extends into an air chamber 46, while the piston 44 reciprocates in a cylinder 48.

Compressed air is introduced through ports 50 and a passageway 52 to the cylinder 48 and may be controlled by a trigger 54 which operates an air valve. The grease gun B further includes ports 56 in the tubular plunger 42 which allow for passage of air. The construction of the grease gun B is shown more or less diagrammatically because it is of the ordinary hammer type, such as shown in the Chapman reissue patent, No. 17,974, of February 17, 1931.

Briefly, the purpose of the variable control device for the exhaust port is to enable regulation of the grease gun for more efficient operation under varying conditions of temperature, type of grease used and type of fitting to be lubricated, as follows:

(1) *Temperature.*—Adjustment of the control device permits more uniform operation over the wide range of temperature from summer to winter operating conditions. With most greases, the Number 4 or large exhaust opening, or largest exhaust port, will be required during the winter months to give the same results as Number 2 during the warm summer months.

(2) *Type of grease used.*—So-called cup greases handle easier than semi-fluid, sticky, viscous lubricants and can therefore usually be satisfactorily delivered with a smaller exhaust port opening. Various adjustments of the control device should be tried by the operator to determine the best setting for the particular lubricant being used.

(3) *Type of fitting.*—Alemite fittings, as shown at 36, have large openings, as will be evidenced by an inspection of Figure 1 in which the check valve 58 is open as when the fitting is receiving grease. This permits free passage of grease up to the maximum capacity of the grease gun.

With a Zerk fitting, as shown at 60 in Figure 4, a very small intake opening 62 is provided which permits passage of only one-third or one-fourth the maximum capacity of the grease gun. The variable control device permits regulation of the grease delivery from as low as one ounce per minute from the grease gun to the maximum capacity thereof which is approximately thirty-six ounces per minute. The maximum flow can, of course, be obtained with the large exhaust opening 4 in registry with the exhaust opening 26. Generally for the lubrication of Zerk fittings, best results will be obtained by using either exhaust opening Number 1 or Number 2. This will eliminate unnecessary loss and waste of grease between the fitting 64 and the end of the hose 37 which is a condition always prevalent when grease delivery is in excess of the capacity of the small opening 62. The grease will squeeze out between the fitting 60 and the fitting 64 regardless of how tightly the fittings are held in contact with each other if the flow of grease is crowded beyond what the opening 62 will permit to pass.

I will now specifically describe how my control device accomplishes the result of varying the stroke of the plunger 40 and the consequent rate of delivery of grease to the fitting 36 or 60, as the case may be.

Referring to Figure 5, the maximum opening 4 is indicated. The piston 44 is in retracted position and air flows in through ports 50 and 56 to behind the piston 44 to drive the plunger 40 toward the left, which is the direction of an expelling stroke. With the large opening 4, it will be evident that the air cushion in the air chamber 46 can be quickly expelled, thereby allowing the plunger 42 to travel toward the left to the position shown in Figure 1 without much cushioning or back pressure. This makes a stroke of the dimension indicated at $a$ in Figure 1.

Referring to Figure 6, however, wherein the control device A is adjusted for exhaust of air through the exhaust opening 1, the exhaust of air from the air chamber 46 is retarded, thereby providing a greater cushioning effect on the expeller plunger 42 and permitting the plunger 40 to move only the distance indicated at $b$.

With the number of strokes of the gun substantially the same per minute it will be obvious that there is less grease delivery per minute with the adjustment in Figure 6 than there is with the adjustment in Figure 1. It is therefore obvious that by varying the effective size of the exhaust port 28 by the control device A, the operation of the gun can be controlled, as desired.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A pneumatic grease gun comprising a cylinder, a reciprocating expeller member therein, said cylinder having an exhaust chamber provided with an exhaust port, said expeller member being cushioned at the end of the expelling stroke by exhaust air in said exhaust chamber and means to vary the stroke of said reciprocating expeller member comprising a tubular member received in said exhaust port, a hollow cap member, one of said members being received within the other one, one of said members having an annular sealing shoulder and the other one having its open end flanged thereover and a spring interposed between said tubular member and said cap member, one of said members having a discharge opening of maximum size and the other one having a plurality of different sized openings to selectively register therewith.

2. A pneumatic grease gun comprising a cylinder, a reciprocating expeller member therein, said cylinder having an exhaust chamber provided with an exhaust port, said expeller member being cushioned at the end of the expelling stroke by exhaust air in said exhaust chamber and means to vary the stroke of said reciprocating expeller chamber comprising a cap-shaped member, a cup-shaped member received therein, one of said members having a screw threaded nipple extending therefrom, an annular sealing joint between said members and a spring within said members to cause resilient engagement of the parts of said annular sealing joint, one of said members having an opening of maximum size and the other one having a plurality of different sized openings ranging from maximum to minimum to selectively register therewith.

HOWARD E. MORTON.